United States Patent [19]
Auchère et al.

[11] 3,931,461
[45] Jan. 6, 1976

[54] TELEREPRODUCTION SYSTEM FOR DOCUMENTS

[75] Inventors: Daniel Auchère, Grenoble; Jean Paul Barbier Neyret, Saint Martin d'Heres, both of France

[73] Assignee: Agence Nationale de Valorisation de la Recherche (ANVAR), Neuilly-sur-Seine, France

[22] Filed: Apr. 24, 1974

[21] Appl. No.: 463,740

[30] Foreign Application Priority Data
Apr. 27, 1973 France .............................. 73.15430

[52] U.S. Cl. ......... 178/6.6 A; 178/6.6 R; 178/6.7 R; 346/74 R
[51] Int. Cl.² ........................................... H04N 1/12
[58] Field of Search ........... 178/6.6 R, 6.6 A, 6.6 B, 178/6.7 R; 346/74 R

[56] References Cited
UNITED STATES PATENTS

| | | | |
|---|---|---|---|
| 2,046,328 | 7/1936 | Kleinschmidt et al. | 178/6.7 R |
| 2,306,687 | 12/1942 | Cox | 178/6.6 R |
| 2,926,057 | 2/1960 | Horsch | 346/74 |
| 3,346,692 | 10/1967 | Garfield et al. | 178/6.6 A |
| 3,394,225 | 7/1968 | Hedger et al. | 178/69.5 |
| 3,541,245 | 11/1970 | Wilby | 178/6.7 R |
| 3,564,120 | 2/1971 | Taylor | 178/6.6 R |
| 3,636,251 | 1/1972 | Daly et al. | 178/6.6 B |
| 3,809,806 | 5/1974 | Walker et al. | 178/6.7 R |

FOREIGN PATENTS OR APPLICATIONS

| | | |
|---|---|---|
| 1,280,157 | 11/1961 | France |
| 1,466,089 | 12/1966 | France |
| 2,020,960 | 7/1970 | France |
| 1,117,639 | 6/1968 | United Kingdom |

*Primary Examiner*—Stuart N. Hecker
*Attorney, Agent, or Firm*—Flynn & Frishauf

[57] ABSTRACT

Apparatus for the telereproduction of documents transmitted in the form of electrical signals emanating from the line-by-line scanning of the original and modulating a carrier or sub-carrier wave, the demodulated video signals being applied to the scanning element of the reproduction apparatus synchronized with the scanning element of the emitter, the apparatus comprising a memory in which is stored the video voltage emanating from demodulation of the signals received, and means for removing these signals from the memory at a speed exactly proportional to that of the line scanner of the recorder, i.e. each time this element has advanced by a step of constant value corresponding to the distance separating two successively recorded dots.

13 Claims, 9 Drawing Figures

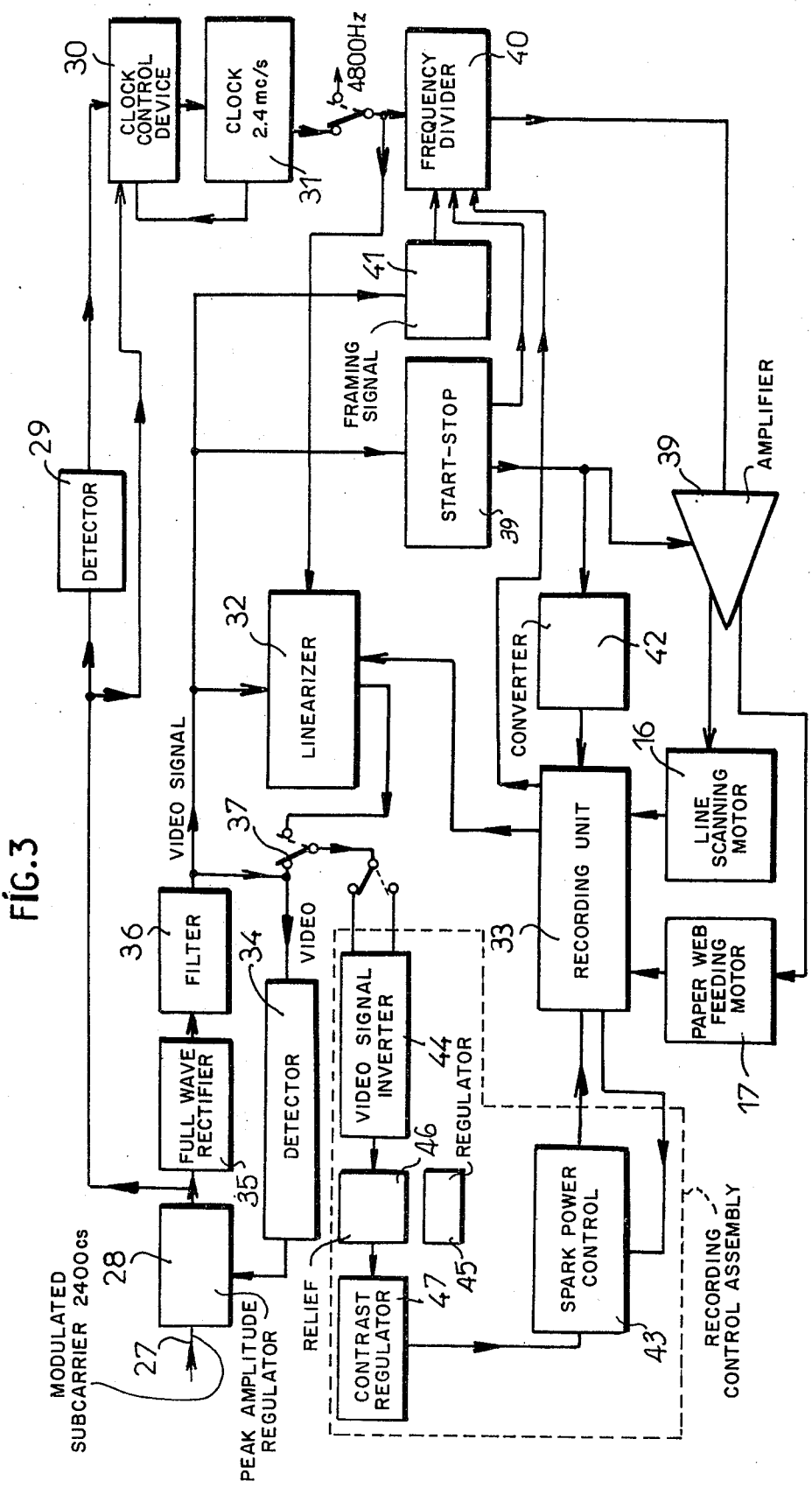

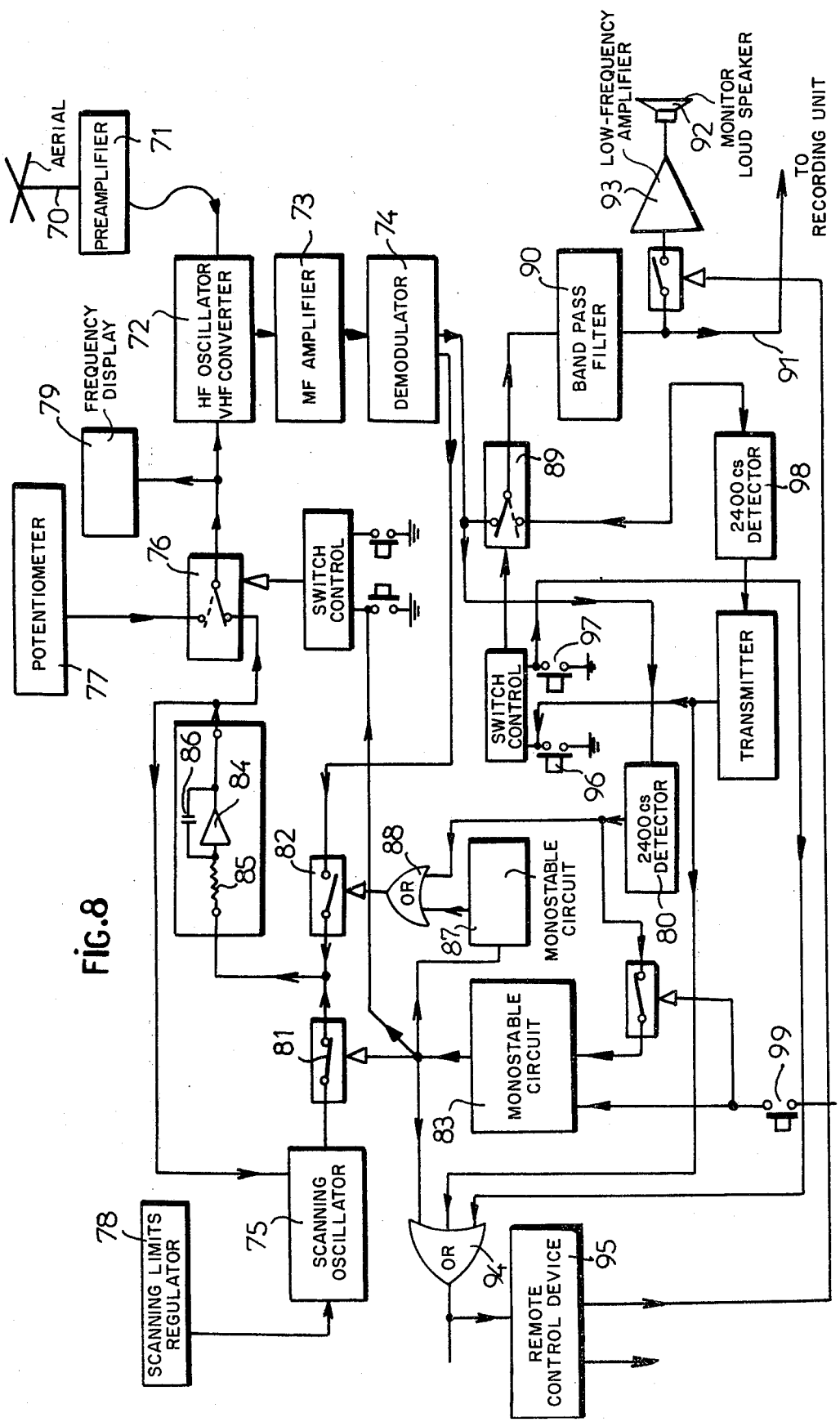

TELEREPRODUCTION SYSTEM FOR DOCUMENTS

This invention relates to an apparatus for the telereproduction of documents transmitted in the form of electrical signals emanating from the line-by-line scanning of the original and modulating a carrier or subcarrier wave, the demodulated video signals being applied to the scanning element of the reproduction unit synchronized with the scanning element of the emitter. More particularly, the object of the invention is to provide a reproduction apparatus of the kind referred to above which, although being relatively small and inexpensive, supplies high-quality reproductions of originals in the form of printed texts, manuscripts or photographs. One of the applications with which the invention is particularly concerned relates to the reproduction of images emitted by meteorological satellites, which at present is carried out, where high-quality reproduction is required, by extremely large and expensive apparatus, in which the images received are treated by television techniques in conjunction with photographic techniques. Other processes, in which the images received are reproduced on special paper by wet processing and chemical reaction between the paper and the metal of a tracer point placed under voltage by the signal, are carried out in smaller and less expensive apparatus, but unfortunately give images of unsatisfactory quality.

SUMMARY OF THE INVENTION

The reproduction apparatus according to the invention enables high-quality images to be obtained by simple means by virtue of the fact that it comprises a memory in which the video voltage emanating from demodulation of the signals received is recorded, and means for removing the signals from this memory at a rate exactly proportional to that of the line scanning element of the recording unit, in other words each time this element is advanced by a step of constant value corresponding to the distance between two successively recorded dots.

In one embodiment of the invention, the apparatus comprises a clock, preferably in the form of a high-stability ($10^{-6}$) transistor oscillator controlled by the carrier wave or subcarrier wave of the signal received, and a frequency divider which, from the clock signal, generates a pilot frequency for feeding the motors responsible for horizontal and vertical scanning, i.e. the line scanning of the recording unit and the continuous delivery of the recording paper.

The apparatus comprises a mechanical scanning unit controlled by a rotating shaft and means for linearizing this scanning comprising a toothed disc which is keyed to the rotating shaft and whose teeth have widths that are not constant, but instead correspond to the equal displacements of the tracer point, and an electro-optical or magnetic reader which is associated with this disc and which releases a signal proportional in frequency to the momentary speed of the tracer points during the scanning of each line, this signal controlling removal of the video signals stored in the memory.

Accordingly, the signals are applied to the tracer point each time it has travelled a certain, constant distance along the scanned line, so that scanning is "linearized".

More particularly, the apparatus comprises an electro-optical reader in the form of a photodiode excited by a light beam periodically interrupted by the teeth of the disc whose intervals correspond, for example, to the length of the line occupied by 12 dots, the frequency of the signal thus obtained being multiplied in such a way as to correspond to the total number of recording dots per line, for example 1,200 dots for 800 dots per line supplied by the video signal.

The recording unit preferably uses an electrosensitive paper with a white surface layer and a black sublayer, and comprises at least one tracer, preferably in the form of a ballpoint to which the video voltage is applied and which, during scanning of the paper, produces a burn proportional to the power of the spark in the surface layer of the paper, which enables half-tones to be reproduced, this power of the spark being adapted to be proportional to the video signal.

BRIEF DESCRIPTION OF THE DRAWINGS

One embodiment of the reproduction apparatus according to the invention and its application in the recording of images transmitted by meteorological satellites, is described by way of example in the following.

FIG. 3 is a block diagram of the electrical circuits of the reproduction apparatus.

FIG. 8 is a block diagram of the circuits used for receiving the signals emanating from a meteorological satellite.

DETAILED DESCRIPTION

Figure 2:
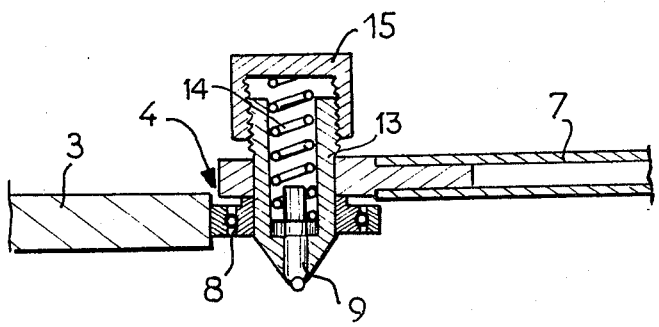
FIG. 2 is a section through a tracer point.

In order to make the invention easier to understand, we shall begin by describing the mechanical scanning unit and the recording unit before going on to discuss the electrical control circuits and their operation. The scanning unit essentially comprises a rotating wheel 1, for example in the form of a star with three arms arranged at 120° intervals, which is mounted on a vertical shaft 2 and which is accommodated in the upper part of a housing containing the various electrical and electronic components of the apparatus. Arranged in this upper part of the apparatus is a plate of insulating material 3 formed with an opening 4 acting as a cam with one straight edge 5. The vertical shaft 2 about which rotates the three-armed star wheel 1 is laterally offset relative to the perpendicular $x'$, $x$ lower to the middle of the straight edge 5 of the cam. Three levers 7, 7', 7'' are pivotally connected at points 6, 6', 6'' situated near the ends of the three arms of the star wheel 1. The longest arms of these levers carry rollers 8, 8', 8'' (FIG. 2) associated with tracer ball-points 9, 9', 9'', while the ends 10, 10', 10'' of the shortest arms are connected through tension springs 11, 11', 11'' to the arms of the star wheel 1 at points 12, 12', 12'', the points 6, 6', 6'' and 12, 12', 12'' being arranged on circles concentric with the pivot 1 and staggered respectively through 120°. As can be seen in FIG. 2, the rollers 8 are each formed by a ball bearing mounted on a tube 13 which is fixed to the end of the lever 7 and in which is able to slide the tracer ball-point 9 applied to the paper by a compression spring 14 adjustable by means of a threaded cap 15.

The recording unit comprises two synchronous motors 16, 17 shown in FIG. 3, one of which (16) drives the star wheel 1 while the other (17) continuously offwinds the web of paper 18 from a roll which is arranged below the plate 3 and with which the ball-points 9, 9', 9'' successively come into contact through an opening formed in the plate 3 opposite the straight edge 5 of the cam. The rate at which the paper is offwound is of course selected in dependence upon the number of lines per second scanned by the emitter unit. For example, in the case of images transmitted by meteorological satellites, this speed corresponds to 4 lines per second, although it can be lower in the case of the telereproduction of fine-print documents or manuscripts.

It will be appreciated that line scanning has to be carried out at a constant speed so that the tracer points have to move at a constant speed during their travel along the straight edge of the cam. A substantially constant speed can be obtained when the ratio (OA/OP) of the distance from the axis O of the wheel to the articulation points of the levers to the distance OP from this axis to the straight edge of the cam is equal to 0.87, and the ratio (AB/OP) of the longest arm of the levers 7 to the aforementioned distance OP is equal to 1.31.

However, if the cam has an abitrary profile outside its straight edge, the mobile assembly formed by the wheel 1, the levers 7 and the springs 11'' can have several equilibrium positions, some stable and the others unstable, which is reflected in a resistant torque varying in dependence upon the angular position of the wheel and, hence, variations in the speed of the synchronous motor driving the wheel, due primarily to the fact that the tensions of the three springs are variable during a cycle, this variation in speed being due to a certain degree of sliding, which does not affect the deenergization value, between the poles of the rotor in the form of permanent magnets and the poles of the stator whose winding produces a rotating field. In order to obviate this disadvantage, the profile of the cam is designed in such a way that the torque produced by the springs in relation to the axis of rotation is permanently zero, so that the rotating system is in a state of indifferent equilibrium in all its positions and that the resistant torque is only formed by substantially constant and, in addition, extremely low friction.

Figure 1:
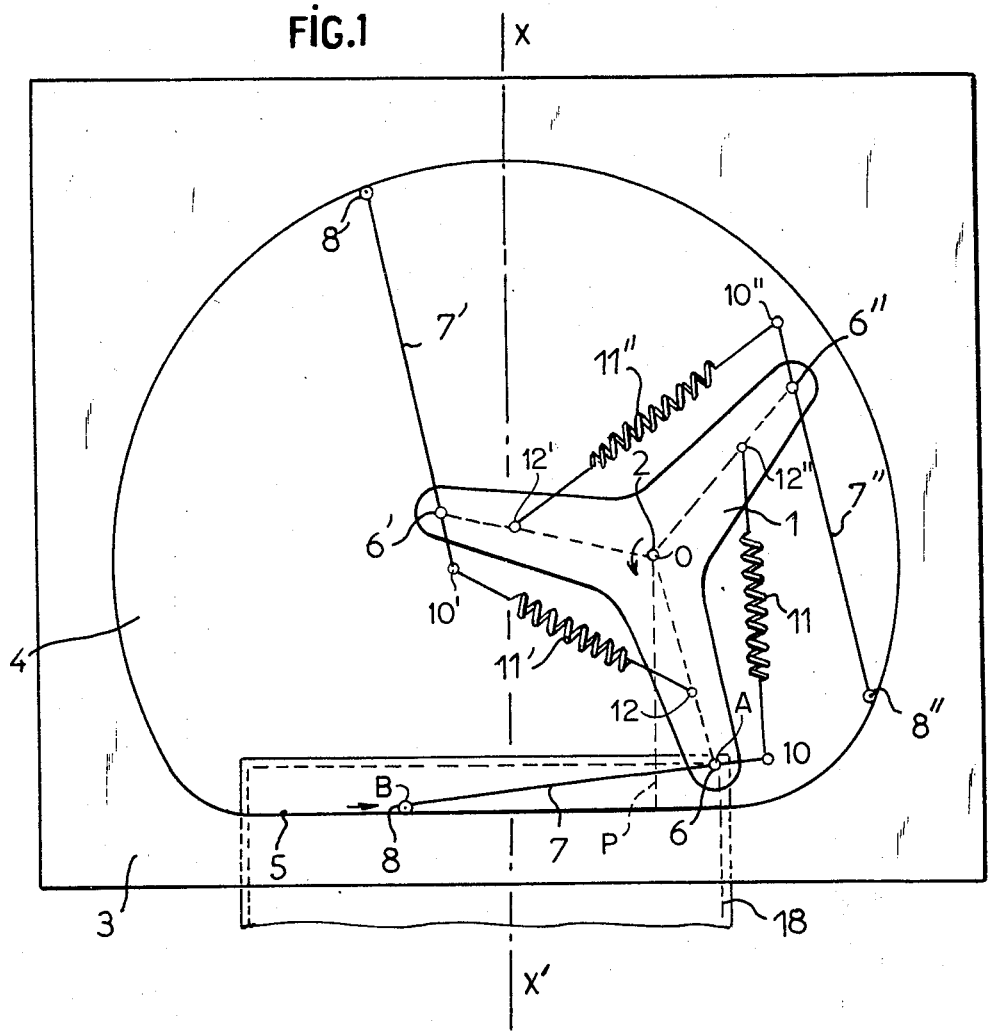
FIG. 1 is a plan view of the mechanical scanning unit of the apparatus.
Figure 5:
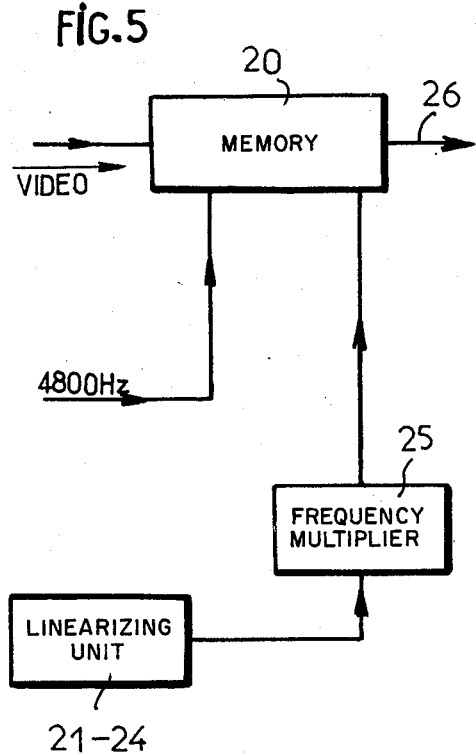
FIG. 5 illustrates the electrical circuits of this arrangement.
Figure 4:
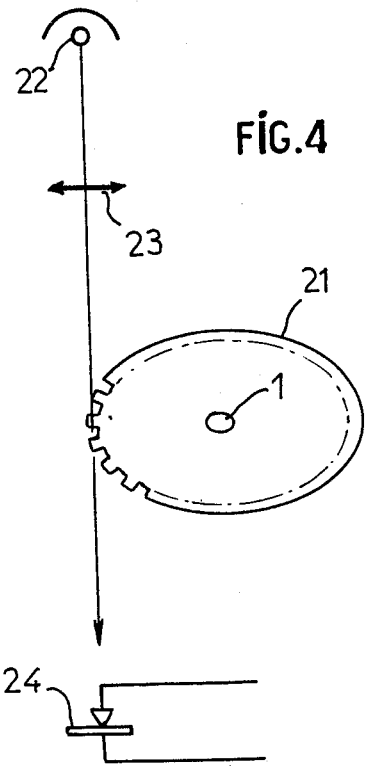
FIG. 4 diagrammatically illustrates the arrangement for reading the memory at the speed of the scanning unit.

By virtue of these various measures, the scanning speed of the tracer points along the straight edge 5 of the cam can be made constant to ± 5%. However, a speed variation of this kind is reflected in poor quality of the image reproduced, above all in cases where the original is in the form of a text, because it gives rise to distortion of the length of the dots transmitted. Accordingly, the invention provides an electronic means for linearizing scanning. As mentioned earlier, this result is obtained by providing the receiver with an analogue memory 20 (FIG. 5) in which the video signals are stored, for example for a period of time corresponding to a fraction of the time required to scan one line, at a frequency generated by a clock functioning in dependence upon the carrier wave or subcarrier wave of the emission received, for example 4800 c/s, and from which these signals are removed to be applied to the tracer points at a frequency strictly proportional to the momentary speed thereof. In this way, the succession of dots of the recorded image corresponds exactly to that of the signals received. Removal or reading of the signals stored in the memory 20 is controlled by means of a toothed disc 21 (FIG. 4) keyed to the shaft 1 carrying the scanning unit. The width of the teeth of this disc is not uniform, but instead is proportional to corresponding equal displacements of the tracer points along the straight edge of the cam. A light source 22 and a lens 23 produce a light beam which is interrupted by the teeth of the disc 21 and which, during its passage through the successive intervals between the teeth, excites a photoelectric cell 24 which controls the reading of a signal and its transmission to the recorder each time a tracer point has travelled a step of constant value. If this step is designated $\Delta x$ and the angular width of the tooth $\Delta\alpha$, the relation between these two values is expressed by the following equation:

$$\Delta x = a \cos \Delta\alpha + b \sqrt{1 - \frac{1-a \sin \Delta\alpha^2}{b}}$$

where $a = OA$, $b = AB$ and $OP = 1$ (cf. FIG. 1).

In order to simplify manufacture of the disc, i.e. in order to eliminate the need for too fine a toothing (for example 1200 dots per line would necessitate 3 times 1,200 teeth), it is sufficient to interpolate with 12 dots between 2 sucessive teeth of the disc 21, so that the number of teeth of the disc will be equal to 3 times 100. The control signal supplied by the photodiode, with a frequency of approximately 400 c/s for a scanning rate of 4 lines per second, is multiplied by 12 in a frequency multiplier 25 and applied to the memory 20 for delivering the signal to the line 26 feeding the recorder at the recording frequency of the signals in the memory, as will be described hereinafter with reference to FIG. 3.

More specifically, it will be assumed that the video signal is transmitted by modulation of a subcarrier wave of 2,400 c/s which arrives at 27 in the reproduction apparatus in order to be initially applied to a peak amplitude regulating device 28 whose operation will be described in more detail hereinafter. The regulated subcarrier issuing from 28 is applied, on the one hand, to a detector 29, in the form of a filter for the 2,400 c/s subcarrier, and, on the other hand, to a control device 30 of a clock 31, the control loop being open in the presence of the 2,400 c/s subcarrier transmitted by the detector 29. The clock signal has a frequency of, for example, 2.4 mc/s which is divided to produce a frequency of 4,800 c/s which is applied to the linearizer described above in reference to FIGS. 4 and 5 and denoted as a whole by the reference 32 in FIG. 3. The regulated subcarrier is applied to a full wave rectifier 35 followed by a filter 36 whose output, namely the video signal, is connected to a detector 34 for the peak level of the video signal which controls the peak amplitude regulator 28. Accordingly, there is obtained at the output of the filter 36 an amplitude-regulated video signal which is applied either directly through the manual switch 37 to the inscription control assembly 44, 46, 47, 43, or indirectly, again through 37, after recording and reading of the memory of the linearizer 32. Accordingly, the apparatus can function either with the linearizer or without the linearizer by virtue of the switch 37, which enables any failure of the linearizer 32 to be immediately overcome.

The regulated video signal is additionally applied to the automatic starting and stopping circuit 38 controlling the amplifier 39 fed by a voltage with a pilot frequency of 48 c/s emanating from a frequency divider 40 connected to the output of the clock 31, the amplifier 39 in turn feeding the motors 16, 17 of the scanning and recording unit. The circuit for controlling the clock and for producing the pilot frequency will be described in detail hereinafter. The automatic starting and stopping circuit also controls operation of the converter 42 which supplies the recording unit with a voltage of the order of 200 volts for supplying the tracer points with the energy required for producing sparks whose power is controlled by a device which will be described hereinafter and which is denoted as a whole by the reference 43 in FIG. 3.

The circuit 40 receives from the mechanical scanning unit a "pip" supplied by a photodiode at the moment when one of the points begins a line. The circuit 40 then measures the time interval separating the instant of this pip with the pip provided by the framing signal emanating from 41, and calculates the period for which the motor has to be supplied with a frequency of 50 c/s (instead of 48) for the two pips to coincide.

Figure 6:
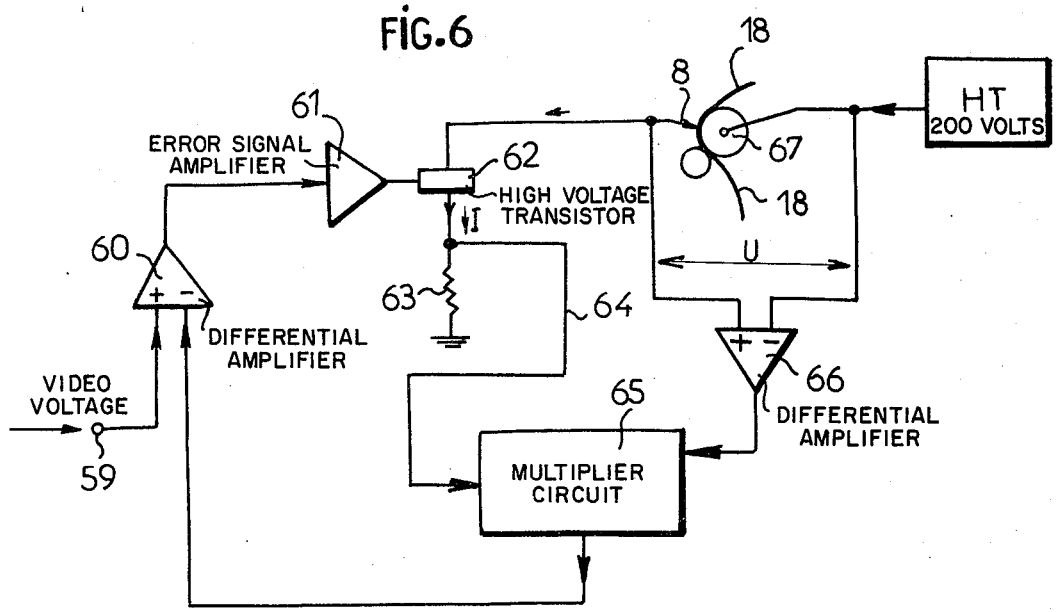
FIG. 6 diagrammatically illustrates the inscription unit operating in dependence upon the power of the spark causing the paper to burn.

The device 44 is a circuit which inverts the video signal and which controls a device 45–46 known per se for regulating relief and a device 47, also known, for regulating contrast which is connected to the device 43 controlling the power of the sparks. This control is shown in detail in FIG. 6, which shows that the video voltage is applied to an input 59 of a differential amplifier 60, while a voltage proportional to the power of the spark is applied to the other input. The error signal amplified at 61 is applied to the base of a highvoltage transistor 62. The resulting collector current I traverses the paper through the spark which is produced at the recording point. As in any transistor, the emitter current, which traverses the resistor 63 earthed at one end, is substantially equal to the collector current. Accordingly, the voltage taken from the emitter of the transistor 62 is proportional to the current I of the spark. This voltage is applied to an input of a diode multiplier circuit 65, whose other input receives, through the differential amplifier 66, the voltage representing the difference between the voltage applied to the tracer point 8 and the high voltage of 200 volts applied to the drum 67 around which the paper travels. Accordingly, the multiplier circuit 65 forms a voltage proportional to the momentary power UI of the spark which, as mentioned above, is applied to the second input of the differential amplifier 60.

Figure 7:
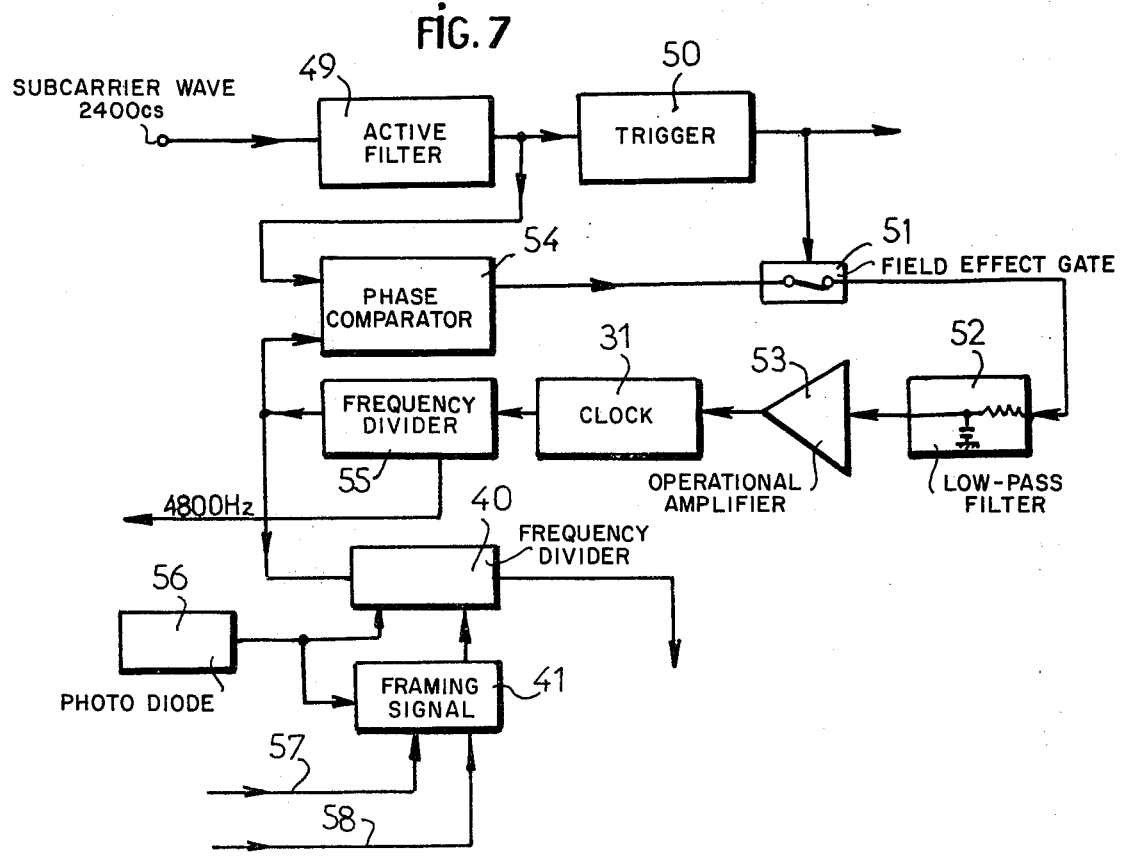
FIG. 7 is a diagram of the circuits used for detecting the presence of the carrier wave or subcarrier wave of the signal received, and for controlling the clock in dependence upon this carrier wave.

The control of the clock in dependence upon the frequency of the carrier wave or subcarrier wave modulated by the video signal is shown in detail in FIG. 7. This clock is preferably in the form of a highly stable Colpitts oscillator with a frequency of 2.5 mc/s which can be controlled by a voltage-variable diode. When the carrier or subcarrier regulated to 2,400 c/s and detected at 49 by an active filter has a sufficient amplitude, the signal closes, through a Schmidt trigger and a field-effect gate 51, the control loop of the clock which comprises a low-pass filter 52 with a memory, resistance and capacitance, an operational amplifier 53 and a phase comparator 54 which receives the carrier wave regulated to 2,400 c/s and the clock signal divided by 1,000 in a frequency divider 55. During the fading periods, the control loop is cut at 51, but the inherent stability of the clock and the memorization in 52 of the control voltage are sufficient to maintain synchronism.

The output of the frequency divider 55 is also connected to the input of a divider 40 (cf. also FIG. 3) which, through a divider by 50 supplies the 48 c/s pilot wave feeding the recording unit. During framing of the image, before its recording, this pilot frequency has a value of 50 c/s: to this end, the divider 40 is connected to the framing circuit 41 and to a photodiode 56 giving the beginning-of-line signal, this framing circuit being additionally controlled at 57 by a signal for beginning transmission of the image and at 58 by a framing signal.

The reproduction apparatus as a whole, comprising the recording unit and all the electronic circuits described above, is accommodated in a housing 435 mm long, 380 mm wide and 320 mm tall. The housing and its contents weighs 20 kilos.

The electrosensitive paper used for recording is in the form of rolls of a web 200 mm wide and 60 m long.

The images obtained measure 180 × 180 mm.

The apparatus is fed by two 12 volt batteries, or from a mains of + 12 volts, − 12 volts with a middle point.

The maximum consumption of the apparatus is 5 A.

It should be noted that the reproduction apparatus described above can also be used for recording the images or documents transmitted by radio or by telephone either directly or with delay, the video signals received being initially recorded on a magnetic tape, for example in a "minicassette" tape recorder, the signals on this tape then being recorded by the reproduction apparatus in the same way as described above for direct recording. (It is pointed out that recording on a small, inexpensive minicassette tape recorder is only made possible by virtue of the linearizer which enables the faults of this type of recorder to be neutralized, in particular by eliminating minor variations in the speed of the magnetic tape). This method of delayed recording is particularly intended for recording images transmitted by meteorological satellites by means of receiving circuits of the kind illustrated in FIG. 3.

It is known that these images are transmitted by the satellites on a carrier wave of high frequency in the range from 135 to 138 mc/s modulated by a sub-carrier wave with a frequency of 2,400 c/s which is itself frequency-modulated by the video voltage occupying a frequency band of 0 to 1,600 c/s. Each image transmitted successively comprises a square starting signal emitted at 300 c/s for 2 seconds, a framing signal emitted for 5 seconds and a video signal transmitted for 200 seconds.

The receiver for the image signals feeding the reproduction apparatus described above essentially comprises a device for automatically tracing the frequency of the satellite, from which it is desired to collect the emission, a device for locking the receiver onto the frequency of the first satellite traced and means for memorizing this frequency so that its emission can be immediately returned after the brief periods during which the signal disappears due to fading.

As illustrated in FIG. 8, this receiver comprises an omnidirectional aerial 70 at the foot of which is arranged a preamplifier 71 feeding a VHF converter 72 comprising a high-frequency heterodyne oscillator which itself feeds a mediumfrequency amplifier 73, to whose output is connected a frequency demodulator 74. The automatic tracer or detector comprises a scanning oscillator 75 which emits a triangular scanning voltage applied to the converter 72 through a gate 76 which also enables a manual search to be made by means of the potentiometer 77. A device 78 enables the scanning limits to be regulated, while an indicator 79 connected to the link between the scanning oscillator 75 and the converter 72 directly displays the corresponding frequency. The scanning voltage controls the frequency of the local oscillator in known manner by means of a diode variable in its capacity in dependence upon the voltage applied to it.

Since the object of automatic searching is to separate out from the emissions received those comprising a 2,400 c/s sub-carrier, the operation of the loop by which the converter 72 is adapted to the frequency received is controlled by a device 80 for detecting the presence of the 2,400 c/s sub-carrier which is connected to the output of the demodulator 74 which is also connected through two series-connected gates 81 and 82, in the form of field-effect transistors, to the scanning oscillator thus forming the control loop: the average output voltage of the demodulator, which is zero when tuning is established, but positive or negative if the receiver is slightly untuned, is delivered through the gate 82 to the diode of the converter 72 in order to adapt its frequency to that of the satellite. The detector 80 controls a first monostable circuit 83 which, when the presence of the 2,400 c/s sub-carrier is detected with sufficient power, controls opening of the gate 81 which thus interrupts scanning, and memorizes the scanning voltage in a memoryequipped integrator comprising an amplifier 84, a series resistor 85 and a parallel capacitor 86, this memoryequipped integrator also being connected to the converter 72. The monostable circuit 83 oscillates on the appearance of the 2,400 c/s sub-carrier and only returns to rest 50 seconds after its disappearance, during which time the frequency of the converter is maintained by the memory 84 – 85 – 86. It is assumed that the fading periods are shorter than 50 seconds in duration and that, if the 2,400 c/s sub-carrier does not return at the end of this time, the emission of the satellite is terminated and scanning can be commenced to trace another satellite.

Figure 9:
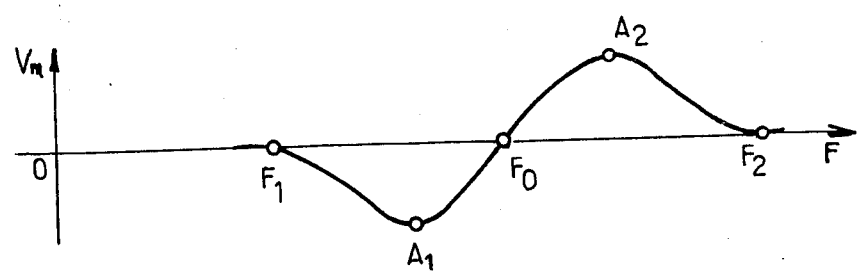
FIG. 9 is a diagram showing how the receiver is locked onto the subcarrier wave of the satellite.

The monostable circuit 87 controlling opening of the gate 82 is provided to facilitate the process by which control of the receiver is locked, and functions as follows:

It is known that, in frequency modulation, there are three tuning points as shown in FIG. 9, in which the frequency F is recorded on the abscissa and the average output voltage $V_m$ of the demodulator on the ordinate. Among the points $F_1$, $F_o$, $F_2$, at which this voltage is neutralized, only the point $F_o$ corresponds to stable tuning, while the points $F_1$ and $F_2$ correspond to unstable tuning. If frequency scanning of the receiver takes place from left to right in FIG. 9, and if the frequency of the satellite is $F_o$, the monostable circuit 83 oscillates as soon as the point $F_1$ is reached, and causes the monostable circuit 87 to oscillate, but since the output voltage $V_m$ of the demodulator becomes negative, the integrator delivers to the diode of the converter a voltage increasing in a direction such that the tuning frequency of the receiver continues to slide towards the right. When the frequency corresponds to the point $A_1$, tuning disappears and the emission of the satellite is no longer received. The device 80 for detecting the presence of the 2,400 c/s sub-carrier then indicates the absence thereof. The monostable circuit 87 intervenes at this moment by keeping the gate 82 closed for 10 seconds, which is sufficient to allow the frequency F to slide to the point $F_o$ which is stable and allows locking. The gate 82 is kept closed through an OR-gate 88 which is connected to the output of the monostable circuit 87 and to the device 80 detecting the presence or absence of the 2,400 c/s frequency.

In one of its positions, a field-effect commutator 89 enables the demodulator 74 to be connected through a band-pass filter 90 operative between 800 and 40,000 c/s (corresponding to the frequency range of the 2,400 c/s modulating video signal) to the reproduction and recording apparatus connected to the line 91, and to a monitor loudspeaker 92 through a low-frequency amplifier 93. The OR-gate controls a remote-control device 95 which places the reproduction apparatus, the tape recorder and the low-frequency amplifier 93 feeding the monitor loudspeaker 92 under voltage in the event of one of the three following eventualities:

1. A satellite is denoted by the reference 76, being in the "manual" or "automatic" position. In this case, the OR-gate 94 is activated by 83.
2. The tape recorder is already in operation and the detector 98 has detected the presence of the 2,400 c/s frequency.
3. The so-called "tape recorder" button is depressed.

In its other position, the commutator 89 connects the reading output of the tape recorder to the reproduction apparatus. On termination of the delayed recording of images, which is indicated by the second device 98 for detecting the presence of the 2,400 c/s frequency, or when the manually traced station disappears, which is indicated by the return of the monostable circuit 83 to its rest position, the commutators 89 and 76 return to their automatic receiving position.

Finally, a pushbutton 99 enables the reception of an emission to be immediately stopped, and scanning to be resumed, which can be of advantage in cases where several satellites pass simultaneously through the receiving zone of the apparatus.

In the case of the teletransmission of documents, such as printed texts, manuscripts or photographs, the emitter can be simply formed by a drum rotating at 4 rpm onto which the document to be transmitted is wound. A carriage displaceable along a generatrix of the drum carries a light source, a lens and a photodiode, the carriage being moved at a speed corresponding to a scanning rate of 4 lines per second. In cases where the reproduction apparatus is designed to receive images from meteorological satellites as described above, the video signals modulate a 2,400 c/s carrier frequency and are initially recorded on a minicassette tape recorder, this recording subsequently being transferred to the reproduction apparatus.

In the case of printed documents or manuscripts, however, the width of the lines forming the characters is of the order of 0.2 mm, which for a scanning rate of 4 rpm gives a video frequency of the order of 2,000 c/s, whereas for images from satellites the video frequency is limited to 1,600 c/s, so that the frequency of the video signal becomes too close to that of the carrier wave and the definition of the document reproduced is not altogether satisfactory. In order to obviate this disadvantage, it is sufficient to reduce the speed of rotation of the drum, for example in such a way that it corresponds to a scanning rate of 0.8 line per second. Tests have shown that definition is considerably improved in this way. Naturally, this simplified apparatus for analyzing documents to be transmitted can incorporate improvements providing for a substantially constant rotational speed of the drum and for a linear response of the photodiode.

I claim:

1. A system for the telereproduction of documents wherein an original document is scanned in a line-by-line manner and corresponding electrical signals are generated, and a carrier or sub-carrier wave is modulated by said electrical signals generated by said line-by-line scanning of the original document to produce a video carrier signal which is transmitted, comprising:

means for receiving and demodulating the transmitted video carrier signal;

a reproduction scanning device in the receiver;

means for synchronizing the operation of said reproduction scanning device with the scanning device of the transmitter;

means for applying the demodulated video signals to said reproduction scanning device at a rate exactly proportional to the speed of scanning thereof, said applying means comprising a memory for storing the video signals obtained from demodulation of the received video carrier signal; and said reproduction scanning device comprising a scanning unit including a line scanning tracer point, a rotating shaft driving said scanning unit, a paper band on which recording is to be made and which is movable in a direction perpendicular to said line scanning tracer point, and a linearizing device comprising a rotating disc driven by said rotating shaft and provided at its edge with teeth having widths corresponding to respective equal displacements of said tracer point along the scanned line, means associated with said disc for supplying a control signal having a frequency proportional to the speed of movement of said tracer point during the scanning of each line and means responsive to said control signal and coupled to said memory for controlling the extraction of the video signals stored in said memory each time said tracer point has advanced by a step of constant value.

2. Apparatus according to claim 1 further comprising a magnetic tape recorder adapted to record the demodulated video signals and means to record said demodulated video signals on the paper band from the tape record.

3. Apparatus according to claim 1 wherein said means for supplying a control signal includes a light source emitting a light beam which is periodically interrupted by the teeth of said rotating disc at intervals corresponding to the length of a line occupied by a number of dots, a photodiode actuated by said periodically interrupted light beam and generating the control signal, and means for multiplying the frequency of said control signal so as to correspond to the total number of dots per line.

4. Apparatus according to claim 3 wherein said scanning unit driven by said rotating shaft comprises three tracer points arranged at 120° intervals with respect to one another, the intervals between two successive teeth of the rotating disc corresponding to the length of a scanned line occupied by 12 dots; and said multiplying means multiplying the frequency of the signals produced by the photodiode to correspond to 1,200 dots for 800 dots per line contained in the video-signal.

5. Apparatus according to claim 1 for the recording of images transmitted by a meteorological satellite on a high-frequency carrier wave in the band of 135 to 138 mc/s modulated by a 2,400c/s sub-carrier which is itself modulated by the video-signals, said apparatus comprising a VHF converter provided with a local oscillator having means for controlling its frequency to scan the range attributed to meteorological satellites, said control means comprising a scanning voltage controlled oscillator for automatically tracing an emission from a satellite, and means for locking the local oscillator onto the received frequency, an integrating circuit equipped with a memory wherein the scanning signal is stored and which is connected to the VHF converter whereby the frequency reached by the local oscillator during a reception is maintained throughout the periods of fading of the satellite's transmission.

6. Apparatus according to claim 5 comprising a filter means for sensing the reception of the 2,400 c/s sub-carrier, said device having means to lock the scanning oscillator in the presence of said sub-carrier after a period of time sufficient to obtain stable tuning of the receiver onto the received high frequency and to close the loop by which the local oscillator of the VHF converter is controlled depending upon said high frequency by disconnecting the memory equipped integrating circuit, means being provided to reestablish said connection if the sub-carrier disappears for a period of 50 seconds, corresponding to the maximum estimated duration of a fading period.

7. Apparatus according to claim 5 comprising synchronous motors for driving the rotating wheel of the scanning unit and the paper band on which the record is to be made, a clock emitting pulses at a frequency of 2,400c/s depending upon the sub-carrier of the video signal, means for successively dividing the clock frequency by 1,000 and by 50 to supply a 48c/s pilot frequency to said synchronous motors.

8. Apparatus according to claim 7 wherein the clock comprises a transistor oscillator controlled by the sub-carrier wave of the received video carrier signal.

9. Apparatus according to claim 1, wherein said reproduction scanning device comprises a wheel in the form of a star having three arms and three levers articulated on said arms respectively at points arranged at 120° intervals with respect to one another; three rollers carried at the ends of the longest arms of said levers respectively; a base plate of insulating material provided with a cam forming cavity and wherein said wheel is mounted, the edge of said cavity having a curved portion and a straight portion; tension springs connecting the ends of the shortest arms of said levers to the arms of the wheel and to press said rollers against the edge of the cam forming cavity; the band of paper on which the record is made being moved below the base plate in a direction perpendicular to the straight edge of said cam; a slot formed in the base plate opposite the straight portion of said cam; the said rollers being provided with tracer points which come successively into contact with the paper through said slot and which successively scan a line of said paper.

10. Apparatus according to claim 9 wherein the axis of rotation of the wheel is offset laterally in relation to the perpendicular to the straight portion of the cam forming cavity at its center; and wherein the ratio of the distance between the axis of the wheel and the articulation points of the levers on the arms of the wheel to the distance between the axis of the wheel and the straight portion of the cam is substantially equal to 0.87; and the ratio of the length of the longest arm of the levers to the distance between the axis of the wheel and the straight portion of the cam is substantially equal to 1.31; whereby the speed of the tracer points along said straight portion of the cam is substantially constant.

11. Apparatus according to claim 9 wherein said paper is an electrosensitive paper having a white upper surface and a black sub-layer; and wherein said tracer points are in the form of ball points provided with springs to press said ball points against said paper; said reproduction scanning device further including means to apply to said ball points a voltage representing the demodulated video signal to produce a spark and a burned spot in the white surface of the paper revealing the said black sub-layer, the size of the burned spot being proportional to the power of said spark; and means for rendering the power of the spark proportional to the demodulated video signal.

12. Apparatus according to claim 11 wherein said reproduction scanning device includes a drum from which the electrosensitive paper is wound off, means for applying to the rotating wheel the voltage representing the signal to be recorded and to apply a high D.C. voltage of the order of 200 volts to said drum.

13. Apparatus according to claim 11 wherein said reproduction scanning device further comprises a differential amplifier of which one input receives the video signal voltage and of which the output voltage is applied to the tracer ball-points; a multiplying circuit to which is fed on the one hand the intensity of the current of the circuit including the tracer ball points and on the other hand a high constant voltage reduced in value by the voltage applied to the tracer ball-points, the output of said multiplying circuit being connected to the second input of said differential amplifier.

* * * * *